United States Patent
Felder et al.

[11] 3,883,535
[45] May 13, 1975

[54] RADIOPAQUE DERIVATIVES OF TRIIODOBENZOIC ACID WITH HETEROCYCLIC SIDE CHAINS

[75] Inventors: Ernst Felder; Davide Pitre, both of Milan, Italy

[73] Assignee: Bracco Industria Chimica, Societa per Azioni, Milan, Italy

[22] Filed: Apr. 7, 1969

[21] Appl. No.: 814,193

[30] Foreign Application Priority Data
May 2, 1968   Switzerland.................... 6625/68

[52] U.S. Cl...... 260/293.64; 260/246 B; 260/247.2; 260/293.76; 260/293.77; 260/293.79; 260/326.25; 260/326.41
[51] Int. Cl. .................... C07d 29/28; C07d 29/30
[58] Field of Search...... 260/326.3, 293.77, 293.79, 260/293.76, 293.64

[56] References Cited
OTHER PUBLICATIONS
Chemical Abstracts, Vol. 58, pp. 4474–4475, (1963).

*Primary Examiner*—Donald G. Daus
*Assistant Examiner*—Jose Tovar
*Attorney, Agent, or Firm*—Hans Berman

[57] ABSTRACT
Compounds of the formula R - R', wherein

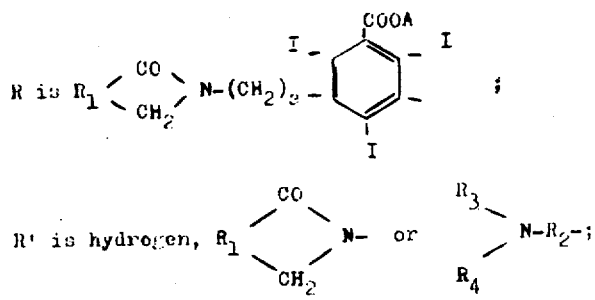

$R_1$ is alkylene or oxaalkylene having 2 or 3 carbon atoms;

$R_2$ is $-(CH_2)_a-$ or $-CO-$;

$R_3$ is hydrogen or lower alkanoyl;

$R_4$ is hydrogen, lower alkyl, or $R-NH-CO-R_5-CO-$, $R_3$ being hydrogen when $R_4$ is $R-NH-CO-R_5-CO$;

$R_5$ is alkylene or polyoxaalkylene having 4 to 8 carbon atoms;

$a$ is zero or one, and $-(CH_2)_a$ is a single carbon-to-carbon bond when $a$ is zero; and A is hydrogen or a non-toxic metal or amine, the compound being water-soluble when A is metal or amine; have been found to be well tolerated, effective contrast media for the X-ray investigation of blood vessels, the urinary tract, and the gall bladder when used parenterally.

19 Claims, No Drawings

RADIOPAQUE DERIVATIVES OF TRIIODOBENZOIC ACID WITH HETEROCYCLIC SIDE CHAINS

This invention relates to X-ray contrast media, and particularly to organic compounds high in iodine content, their preparation, and their use.

Many iodine-bearing organic compounds have heretofore been proposed for use in the radiography of body cavities other than the intestinal tract. Those compounds which can only be applied orally, are usually resorbed in the intestine to a small part, and X-ray images of adequate density are not readily produced with amounts of contrast agent small enough not to cause diarrhea and other side effects. The known contrast agents recommended for parenteral application in cholecystography are known to produce serious accidents in some cases (see La Radiologia Medica 52 (July 1966) 626–627).

The primary object of the invention is the provision of radiopaque compounds of a type not known heretofore which are well tolerated in effective doses parenterally applied, and some of which are particularly effective in cholecystography.

The compounds of the invention are derivatives of 2,4,6-triiodobenzoic acid whose benzene ring carries a side chain. A heterocyclic ring in the side chain includes the radical —CO—N—CH$_2$—whose nitrogen atom is bound to the benzene ring of the triiodobenzoic acid either directly or through a methylene group, that is, a carbon chain having not more than one member.

More specifically, the compounds of the invention have the formula R - R', wherein

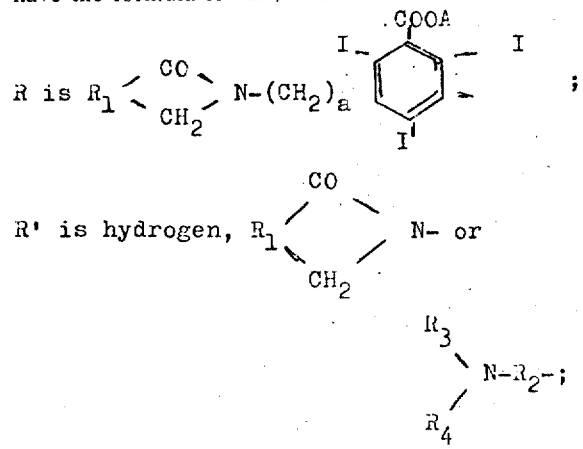

R$_1$ is alkylene or oxaalkylene having 2 or 3 carbon atoms; R$_2$ is —(CH$_2$)$_a$—or —CO—;
R$_3$ is hydrogen or lower alkanoyl;
R$_4$ is hydrogen, lower alkyl, or R—NH—CO—R$_5$—CO—, R$_3$ being hydrogen when R$_4$ is R—NH—CO—R$_5$—CO;
R$_5$ is alkylene or polyoxaalkylene having 4 to 8 carbon atoms;

$a$ is zero or one, and —(CH$_2$)$_a$ is a single carbon-to-carbon bond when $a$ is zero; and A is hydrogen or a non-toxic metal or amine, the compound being water-soluble when A is metal or amine;

The heterocyclic ring may thus be the radical of a lactam of aminobutyric or of one of the aminovaleric acids or of a morpholinone. The compounds of the invention in which A is hydrogen are insoluble or only slightly soluble in water and are used parenterally in the form of their water-soluble non-toxic salts with metals and amines. The alkali metal salts and salts of the free acids of the invention with the alkanolamines commonly employed in medicinal compounds as inert cations for use with active anions are readily soluble in water. The sodium and lithium salts are best tolerated among the alkali metal salts and very easily soluble in cold water. The calcium and magnesium salts of some compounds of the invention have adequate solubility in water and are non-toxic. Typical suitable alkanolamines are N-methylglucamine and diethanolamine, but others are equally effective.

Compounds of the invention in which R' is —NH—CO—R$_5$—CO—NH—R, that is, compounds of the formula

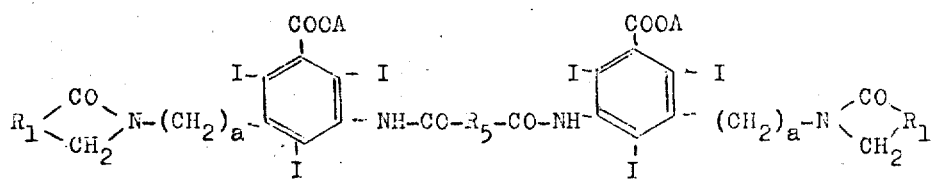

tend to accumulate preferentially in the gall bladder when injected or infused into the veins or muscles of a warm-blooded animal such as man, and are therefore preferred for cholecystography. Those compounds which have only one triiodobenzoic acid moiety in their molecules are preferred for urography and angiography. When suitably compounded, the compounds of the invention may also be employed as contrast media for bronchography, hysterosalpinogography, and for the visualization of other body cavities in which iodine bearing organic compounds have been used heretofore. All compounds of the invention are well tolerated when applied intravenously.

The manner in which compounds of the invention having a single triiodobenzoic acid moiety are excreted almost entirely with the urine as is preferred in urography is shown in Table 1 which identifies the compounds by capital letters and refers to Examples given hereinbelow of methods for preparing the compounds. The Table lists toxicity values determined by standard methods on mice and expressed as DL$_{50}$ in grams of compound per kilogram of mouse weight. It also lists the percent fraction of the compound which was found in the urine and in the bile of rabbits three hours after the intravenous injection of 100 mg of the compound per kilogram of rabbit weight.

TABLE 1

| Compound | Toxicity DL$_{50}$,g/kg | Secretion % into Urine | Bile |
|---|---|---|---|
| G 3-N-Butyrolactamyl-5-acetyl-amino-2,4,6-triiodobenzoic | | | |

TABLE 1-Continued

| Compound | Toxicity $DL_{50}$ g/kg | Secretion % into Urine | Bile |
|---|---|---|---|
| acid (Ex.7) | 11.0 | 68 | 0.6 |
| J 3-N-Butyrolactamylmethyl--5-acetylamino-2,4,6-triiodobenzoic acid (Ex.10) | 9.6 | 85 | 1.2 |
| X 3-N-Butyrolactamyl-5-acetylaminomethyl-2,4,6-triiodobenzoic acid (Ex.18) | 10.0 | 83 | 3 |
| Y 3-(Morpholinon-3'-yl-4')-5--acetylaminomethyl-2,4,6-triiodobenzoic acid(Ex.19) | 10.0 | 75 | 3 |
| H 3-(Morpholinon-3'-yl-4')-5--acetylamino-2,4,6-triiodobenzoic acid (Ex.8) | 8.0 | 57 | 2 |
| E 3-(Morpholinon-3'-yl-4')-5-N--methylcarbamyl-2,4,6-triiodobenzoic acid (Ex.5) | 9.6 | 52 | 1 |
| B (Morpholinon-3'-yl-4')-2,4,6-triiodobenzoic acid (Ex.2) | >5 | 86 | 1.4 |

The compounds of the invention which have two triiodobenzoic acid moieties in their molecules and are generally preferred for cholecystography are also useful for intramuscular injection. The toxicities and secretion values of representative compounds of this group are listed in Table 2, the data being arrived at as described above with reference to Table 1. Corresponding data for two known cholecystographic contrast media are also listed.

TABLE II

| Compound | Toxicity $DL_{50}$ g/kg | Secretion % into urine | bile |
|---|---|---|---|
| N Azelaic acid bis(3-N-butyrolactamylmethyl-5-carboxy-2,4,6-triiodoanilide)(Ex.14) | 3.8 | 45 | 15 |
| O Sebacic acid bis(3-N-butyrolactamylmethyl-5-carboxy-2,4,6-triiodoanilide) (Ex.14) | 2.35 | 55.7 | 11.9 |
| M Suberic acid bis(3-N-butyrolactamylmethyl-5-carboxy-2,4,6-triiodoanilide) (Ex.13) | 6.4 | 51 | 16 |
| R 4,7-Dioxadecane-1,10-dioic acid bis-(3-N-butyrolactamylmethyl-5-carboxy-2,4,6-triiodoanilide) (Ex.14) | 10.7 | 40 | 17.5 |
| T 4,7-Dioxadecane-1,10-dioic acid bis-(3-N-δ-valerolactamylmethyl-5-carboxy-2,4,6-triiodoanilide) (Ex.15) | 6.0 | 34 | 27 |
| S 4,8-Dioxaundecane-1,11-dioic acid bis-(3-N-butyrolactamylmethyl-5-carboxy-2,4,6-triiodoanilide) (Ex.14) | 10.0 | 52 | 30 |
| IP Iodipamide | 2.38 | 37 | 38 |
| IA Ioglycamic acid | 3.75 | 30 | 41 |

Table II clearly indicates the superior bilitropism and usually much lower toxicity of the compounds of the invention as compared to the known Compounds IP and IA. The results of actual radiographic tests on dogs and cats are tabulated in Table III which lists cholecystographic index values according to Hoppe (see Margolin, et al., J. Am. Pharm. Assn 42 (1953) 476–481) ranging from zero to a maximum of 4. The notes have the following meaning:

1 — dog
2 — cat
a — 100 mg tested compound injected intravenously per kg.
b — 165.6 mg iodine per kg, intravenous injection c — 165.6 mg iodine per kg by intravenous infusion over 4 hours.

TABLE III

| Compound | Note | Cholecystographic Index After | | | | | |
|---|---|---|---|---|---|---|---|
| | | 1 hr. | 2 hrs. | 4 hrs. | 6 hrs. | 8 hrs. | 24 hrs. |
| N | 1 | Median value 1.75 | | | | | |
| O | 1 | Median value 3.5 (intramuscular injection) | | | | | |
| M | 1-a | 1.5 | 1.75 | 1.5 | 2 | 1.25 | 1 |
| | 2-a | 1 | 1.75 | 2.5 | 3 | 2.75 | |
| R | 1-a | 1.5 | 1.5 | 2 | 2.75 | 2.25 | 1 |
| | 1-b | 1 | 1.5 | 2.5 | 3 | | |
| T | 1-a | 1 | 1.75 | 2.25 | 2.25 | 2.25 | |
| S | 1-a | 1.5 | 2 | 2.25 | 2.25 | 2.25 | 1 |
| | 1-c | 0.5 | 1 | 2 | 2.5 | 3 | |
| IA | 1-a | 0.5 | 1 | 1 | 1 | 1.2 | 0.5 |
| | 2-a | 0.5 | 0.7 | 1.2 | 2 | 2.5 | |

The compounds of the invention are synthesized from triiodobenzoic acid derivatives of the formula

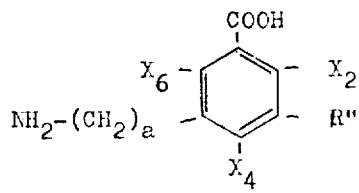

in which R'' is hydrogen, nitro, amino, acylamino, acylaminomethyl, N-alkylacylamino, N-alkylcarbamyl, or alkylenediacylamino, the term alkylene including oxaalkylenes, by reaction with a reactive acyl derivative of an acid of the formula

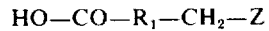

HO—CO—R$_1$—CH$_2$—Z

In these formulas X$_2$, X$_4$, X$_6$ is hydrogen or halogen, Z is the reactive radical of a strong acid, particularly halogen (chlorine, bromine, iodine), sulfate or sulfonate, and R$_1$ and $a$ are as defined above. The preferred reactive acyl derivatives are the acyl halides, the anhydrides, or the reactive esters.

The reaction is continued until a side chain of the formula

(CH$_2$)$_a$—NH—CO—R$_1$—CH$_2$—Z is formed on the benzene ring of the starting compound. The side chain is thereafter cyclized in an alkaline medium. If X$_2$, X$_4$, X$_6$ are initially different from iodine, they are converted to iodine, R'' is converted to the desired R' by methods conventional in themselves if initially different from R', and the carboxyl group on the benzene ring may be converted to —COOA in which A is different from hydrogen.

When R'' is nitro, the nitro group may be converted to amino by hydrogenation, whereby X$_2$, X$_4$, X$_6$ are simultaneously converted to hydrogen if initially different from hydrogen, and said hydrogen is converted subsequent to the hydrogenation to iodine by reaction with a complex iodinechlorine compound in a manner conventional in itself.

In preparing the compounds of the invention which have two triiodobenzoic acid moieties in their molecules, that is those in which R' is R—NH—CO—R$_5$—CO—NH—, it is preferred to react a starting compound of the formula,

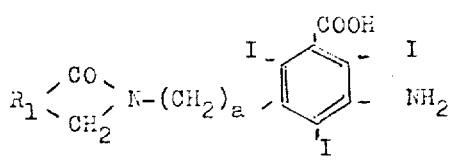

with a reactive diacyl derivative of a dicarboxylic acid having the formula HOOC—R₅—COOH in an approximate ratio of two moles of the starting compound to one mole of the diacyl derivative at a temperature of 20° to 250°C. in the presence of an inert solvent until the amino groups on the two molecules of the starting compound are linked to constitute the group —NH—CO—R₅—CO—NH—, and to convert the carboxyl group of the starting compound to —COOA if different from the desired —COOA. The reactive diacyl derivatives of the dicarboxylic acids which are employed to best advantage are the acyl halides, the acyl azides, and the anhydrides.

If it is desired to prepare compounds of the invention in which R' is

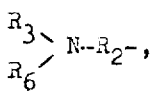

$R_2$ and $R_3$ being as defined above, and $R_6$ being lower alkyl, alkylating agents such as lower-alkyl halides, sulfates, and sulfonates are reacted with compounds of the invention in which R' is $R_3$—NH—$R_2$—.

The manner of preparing and using the compounds of the invention will become evident from the following Examples, but it will be understood that the invention is not limited to the compounds specifically referred to. The numerous closely related compounds embodying the aforementioned group —CO—N—CH₂—in a heterocyclic ring whose nitrogen atom is linked directly or through a single methylene group to the benzene ring of a 2,4,6-triiodobenzoic acid derivative which are arrived at by permutation of substituents and substitution of other lower alkyl radicals for the methyl and ethyl groups more specifically disclosed and preferred, are prepared by methods obvious from the Examples and are equally effective. The sole instance of a critical limitation on the length of a carbon chain has been pointed out above.

EXAMPLE 1

3-N-Butyrolactamyl-2,4,6-triiodobenzoic acid (Compound A)

6.2 g 3-γ-chlorobutyramido-2,4,6-triiodobenzoic acid (0.01 mole) were dissolved in 15 ml 2.67 N aqueous potassium hydroxide, and the solution was kept at 70°C. for three hours, cooled to ambient temperature, diluted with 30 ml water, and extracted with diethyl ether. The ether extract was discarded, and the aqueous phase was exposed to a vacuum to remove the ether therefrom and acidified with hydrochloric acid, whereby crude Compound A was precipitated. It was recovered in an amount of 5.5 g (94.4% yield) and had a melting point of 260° to 265°C.

The pure Compound A recrystallized from 80 ml methanol melted at 270° – 272°C. and was identified by elementary analysis.

| Calculated for C₁₁H₈I₃NO₃: | 22.66% C; | 1.38% H; | 65.31% I |
|---|---|---|---|
| Found: | 22.62 | 1.46 | 65.31 |

A thin layer chromatogram developed on silica gel (GF 254 Merck) with butyl acetate/glacial acetic acid/-water 5:1:1 gave a single spot at $R_f$ = 0.62. The free acid is insoluble in water, readily soluble in warm methanol or ethanol. The salts with sodium, lithium ethanolamine, diethanolamine, N-morpholine, N-methylglucamine, and like non-toxic cations are readily soluble in water.

The 3-γ-chlorobutyramido-2,4,6-triiodobenzoic acid was prepared by heating 41.2 g dry 3-amino-2,4,6-triiodobenzoic acid in about 300 ml boiling anhydrous chlorobenzene with 14 g γ-chlorobutyryl chloride for two hours. The precipitate formed was reprecipitated from ethyl acetate with petroleum ether in a yield of 40.3 g (80%). M.P. 208°–210°C. $R_f$ = 0.57 with the above solvent system. The substrate was silica gel GF 254 (Merck) which was used throughout these Examples.

EXAMPLE 2

3-(Morpholinon-3'-yl-4')-2,4,6-triiodobenzoic acid (Compound B)

Compound B was prepared from 6.35 g (0.01 mole) 3-(β-chloroethoxyacetylamino)-2,4,6-triiodobenzoic acid of the formula CH₂Cl—CH₂—O—CH₂—CO—NH—C₆HI₃—COOH by dissolving the acid in 15 ml 2.67 N potassium hydroxide. Ring closure occurred spontaneously at ambient temperature within 20 hours, and the reaction mixture was then worked up as described in Example 1 to 5.6 g crude Compound B (93.5% yield) which melted with decomposition at 270°C.

The pure compound recrystallized from 300 ml 95% ethanol melted at 280°C. (decomp.), and had an $R_f$ value of 0.24 under the conditions of Example 1. It is insoluble in water, chloroform, and ethyl acetate, and only sparingly soluble in the lower alkanols. It was identified by its iodine content of 63.53% (63.57% calculated for C₁₁H₈I₃NO₄).

The necessary 3-(β-chloroethoxyacetylamino)-2,4,6-triiodobenzoic acid was prepared by heating 20.6 g 3-amino-2,4,6-triiodobenzoic acid with 7.6 g β-chloroethoxyacetyl chloride in 160 ml dioxane at 90°C. for three hours, and pouring the reaction mixture into water. The precipitate formed was recrystallized from ethanol and melted at 231°C. (decomp.). The yield was 15.8 g (62%).

EXAMPLE 3

3-N-δ-Valerolactamyl-2,4,6-triiodobenzoic acid (Compound C)

A solution of 20.6 g 3-amino-2,4,6-triiodobenzoic acid (0.04 mole) in 40 ml dimethylacetamide was heated to 90°C., and 10 g (0.05 mole) δ-bromovaleryl chloride were added. The reaction mixture was stirred at 90°C. for three hours, cooled to room temperature, and poured into 300 ml water to precipitate 26 g crude 3-N-δ-bromopentanoyl-amino-2,4,6-triiodobenzoic acid (M.P. 120° – 130°C.)

This crude acid was dissolved in 50 ml 2.12 N aqueous potassium hydroxide, and the solution was left to stand at ambient temperature for 16 hours. It was then diluted with water to 250 ml, adjusted to pH 4, and extracted with a little ethyl ether to remove impurities. The aqueous phase was exposed to a vacuum to remove ether, and strongly acidified to precipitate crude Compound C in an amount of 21 g (87% yield). M.P. 233° – 235°C.

When recrystallized from 200 ml ethanol, the pure Compound C melted at 235° to 238°C. $R_f$ = 0.29 (butyl acetate/glacial acetic acid/water = 5:1:1). It is insoluble in water, chloroform, and oils, soluble in cold methanol and ethanol, very readily soluble in boiling methanol or ethanol. It was identified by elementary analysis and by its equivalent weight (eq.wt.).

| Calculated for $C_{12}H_{10}I_3NO_3$: | Eq.wt. 597; | 24.14% C; | 63.78% I |
|---|---|---|---|
| Found: | 600 | 24.13 | 63.78 |

The sodium and N-methylglucamin salts were prepared from equivalent alcohol solutions of the acid and base by evaporation of the solvent and are readily soluble in equal weights of water.

EXAMPLE 4

3-N-Butyrolactamyl-5-N-methylcarbamyl-2,4,6-triiodobenzoic acid (Compound D)

8.4 g γ-chlorobutyryl chloride (0.06 mole) were added drop by drop to a suspension of 28.6 g (0.05 mole) 3-amino-5-N-methylcarbamyl-2,4,6-triiodobenzoic acid in 30 ml dimethylacetamide at 90°C. The mixture was stirred for three hours at 90°C., cooled, and poured into 500 ml water to precipitate 27.6 g 3-N-γ-chlorobutanoylamino-2,4,6-triiodo-5-N-methylcarbamylbenzoic acid having a melting point of more than 250°C. and an equivalent weight of 679 as compared to the expected value of 676.5.

The material was dissolved in 60 ml 2.5 N aqueous potassium hydroxide. The solution was left to stand for about 20 hours at room temperature, diluted with 200 ml water, adjusted to pH 4, decolorized with active carbon, and strongly acidified with hydrochloric acid at 50°C.

20 g Compound D (63% yield) were precipitated. A solution of the crude compound in the necessary minimum of concentrated ammonium hydroxide solution was poured into an excess of dilute hydrochloric acid at 50°C. whereby the Compound D of M.P.251°C. was precipitated. It gave an $R_f$ value of 0.51 on silicagel with butanol/glacial acetic acid/water 3:2:1, was insoluble in chloroform, somewhat soluble in water (2–4%), readily soluble in lower alkanols. It was identified by elementary analysis.

| Calculated for $C_{13}H_{11}I_3N_2O_4$: | 24.40% C; | 59.50% I |
|---|---|---|
| Found: | 23.80 | 58.50 |

The sodium salt dissolves in water to about 40 g/dl, the glucamin salt is soluble in an equal weight of water.

EXAMPLE 5

3-(Morpholinon-3'-yl-4')-5-N-methylcarbamyl-2,4,6-triiodobenzoic acid (Compound E)

When 28.6 g 3-Amino-5-N-methylcarbamyl-2,4,6-triiodobenzoic acid in 30 ml dimethylacetamide were reacted at 90°C. with 9.4 β-chloroethyoxy acetylchloride under the conditions of Example 4, 28 g 3-(n-β-chloroethoxy acetylamino)-5-N-methylcarbamyl-2,4,6-triiodobenzoic acid were obtained having a melting point above 250°C., and an equivalent weight of 697 (calculated: 692.5). Ring closure occurred in a solution of the last mentioned compound in 50 ml 3 N aqueous potassium hydroxide, and 22 g of the pure Compound E (68% yield) were obtained. M.P.250°C. $R_f = 0.58$ on silica gel with butanol/glacial acetic acid/water 3:1:1.

The free acid is insoluble in chloroform, slightly soluble in water, cold methanol and cold ethanol, readily soluble in boiling methanol and ethanol. It was identified by elementary analysis and by its equivalent weight.

| Calculated for $C_{13}H_{11}I_3N_2O_5$: | Eq.wt. 658; | 23.80% C; | 58.04% I |
|---|---|---|---|
| Found: | | 656 | 23.18 | 56.35 |

The sodium and N-methylglucamine salts of Compound E were prepared as described above are are soluble in equal weights of water at 20°C.

EXAMPLE 6

3-N-δ-Valerolactamyl-5-N-methylcarbamyl-2,4,6-triiodobenzoic acid (Compound F)

22.05 g 3-N-δ-Bromopentanoylamino-5-N-methylcarbamyl-2,4,6-triiodobenzoic acid were dissolved at 20°C. in 45 ml 2.7 N aqueous potassium hydroxide. The solution was stored 15 hours, diluted with 250 ml water, adjusted to pH 5, decolorized with active carbon, and strongly acidified to precipitate crude Compound F in an amount of 12.8 g (65.5% yield). M.P.250° – 253°C.

It was purified by dissolution in a small amount of ammonium hydroxide solution, and the ammonium salt was precipitated by salting out with ammonium chloride, dissolved in pure water, and converted to the acid by precipitation with hydrochloric acid. The purified acid was identified by its equivalent weight and elementary analysis.

| Calculated for $C_{14}H_{13}I_3N_2O_4$: | Eq.wt. 654; | 25.71% C; | 58.22% I |
|---|---|---|---|
| Found: | | 654 | 25.82 | 58.03 |

Compound E gave an $R_f$ value of 0.57 (butanol/glacial acetic acid/water 3:2:1), is insoluble in chloroform, somewhat soluble in water, and readily soluble in lower alkanols. The sodium and N-methylglucamine salts dissolve in equal amounts of water.

The 3-N-δ-Bromopentanoylamino-5-N-methylcarbamyl-2,4,6-triiodobenzoic acid was prepared as described in Example 4 from 28.6 g 3-amino-5-N-methylcarbamyl-2,4,6-triiodobenzoic acid and 11.95 g δ-bromovaleryl chloride in an amount of 34.8 g (94.8% yield). The crude compound had a melting point of 260° – 262°C. which was raised to 277°–279°C. by reprecipitating the compound from boiling methanol with water.

EXAMPLE 7

3-N-Butyrolactamyl-5-acetylamino-2,4,6-triiodobenzoic acid (Compound G)

28.6 g 3-Amino-5-acetylamino-2,4,6-triiodobenzoic acid (0.05 mole) were suspended in 40 ml dimethylacetamide, and 8.4 g (0.06 mole) δ-chlorobutyryl chloride were added to the suspension at 90°C. The mixture so obtained was stirred at 100°C. for three hours, cooled, and poured into 600 ml water. 26g 3-N-δ-chlorobutyrylamino-5-acetylamino-2,4,6-triiodobenzoic acid were recovered in solid form. M.P.220° – 223°C. Equivalent weight 672 (calculated: 675). The intermediate was dissolved in 50 ml 3 N potassium hydroxide, and the solution was stored overnight at room temperature to close the ring. Compound G was precipitated when the solution was made strongly acid, and was purified by dissolution in ammonium hydroxide solution and precipitation with hydrochloric acid. The pure Compound G obtained in an amount of 17.5 g (55% yield) had a melting point of 250°C. and an $R_f$ value of 0.45 with butanol/glacial acetic acid/water 3:1:1, and was identified by its equivalent weight and elementary analysis:

| | | | | |
|---|---|---|---|---|
| Calculated for $C_{13}H_{11}I_3N_2O_4$: | Eq.wt. | 640; | 24.40% C; | 59.52% I |
| Found: | | 640 | 24.42 | 59.50 |

The acid is insoluble in water and chloroform, soluble in boiling ethanol, readily soluble in boiling methanol. The sodium and N-methylglucamine salts dissolve in equal weights of water at 20°C.

EXAMPLE 8

3-(Morpholinon-3'-yl-4')-5-acetylamino-2,4,6-triiodobenzoic acid (Compound H)

Using the general procedure described in Example 7, 28.6 g 3-amino-5-acetylamino-2,4,6-triiodobenzoic acid and 9.4 g δ-chloroethoxyacetyl chloride were reacted to 29 g 3-N-δ-chloroethoxyacetylamino-5-acetylamino-2,4,6-triiodobenzoic acid. M.P.250°C. Ring closure was brought about in 50 ml 3.3. N aqueous potassium hydroxide, and the crude Compound H was purified by mixing a suspension of the acid in warm ethanol with an equivalent amount of cyclohexylamine, whereby the acid was dissolved, and the cyclohexylamine salt was precipitated upon cooling. The pure Compound H recovered from an acidified aqueous solution of the cyclohexylamine salt weighed 18 g (55% yield) and had a melting point of 250°C. $R_f$ = 0.59 with butanol/glacial acetic acid/water 3:2:1. It was identified by its equivalent and elementary analysis as $C_{13}H_{11}I_3N_2O_5$.

| | | | | |
|---|---|---|---|---|
| Calculated: | Eq.wt. | 656; | 23.80% C; | 58.04% I |
| Found: | | 661 | 23.74 | 57.90 |

It is insoluble in water, chloroform, and the lower alkanols, but the sodium and N-methylglucamine salts readily dissolve in eqial weights of water.

EXMAPLE 9

3-N-butyrolactamylmethyl-5-amino-2,4,6-triiodobenzoic acid (compound I)

507 g γ-Chlorobutyryl chloride (3.6 mole) were added to 691.8 g (3 mole) 3-aminomethyl-5-nitro-6-chlorobenzoic acid (see Helv. chim.Acta 48 (1965) 259) suspended in 3,000 ml dioxane at 90°C. over a period of one hour with agitation. Stirring at the same temperature was continued for six hours, and the reaction mixture was then poured into 30 – 40 liters water. The precipitate formed was dissolved in 6 liters 5% sodium bicarbonate solution, and the solution was decolorized with active carbon and strongly acidified with hydrochloric acid to precipitate 700 g 3-N-γ-chlorobutyrylaminomethyl-5-nitro-6-chlorobenzoic acid of M.P. 128° – 130°C. having an equivalent weight of 335, as calculated, and an $R_f$ value of 0.40 in chloroform/glacial acetic acid 4:1.

The 700 g (2.09 mole) of the last-prepared compound were dissolved in 3,000 ml water containing 540 g (8.36 mole) 35% potassium hydroxide, and the solution was left to stand overnight at ambient temperature, diluted with water to 10 liters, and strongly acidified with hydrochloric acid to precipitate 436 g 3-N-butyrolactamylmethyl-5-nitro-6-chlorobenzoic acid (71% yield) having a melting point of 227° – 229°C., an equivalent weight of 300.5 (calculated: 298.7), and an $R_f$ value of 0.30 with butyl acetate/glacial acetic acid/water 5:1:1.

72 g 3-N-butyrolactamylmethyl-5-nitro-6-chlorobenzoic acid (0.24 mole) were dissolved in 5 liters water containing 240 ml 1 N NaOH and hydrogenated in the presence of 9 g 10% palladium-carbon catalyst at 50° – 55°C., while the pH was held between 6 and 7 by the gradual addition of 240 ml N sodium hydroxide solution to the hydrogenation mixture. When enough hydrogen had been absorbed for converting the nitro group to the corresponding amino group and for eliminating chlorine from the benzene ring, the catalyst was removed by filtration, and the filtrate containing the sodium salt of 3-N-butyrolactamylmethyl-5-aminobenzoic acid was poured into 40 liters water containing 300 ml 36% hydrochloric acid.

800 Ml N $KICl_2$ solution were added gradually over a period of one hour to the solution with agitation at 50°C., and the mixture was then kept at that temperature for 15 hours to complete the iodation. The crude Compound I was filtered off with suction and dissolved in sodium hydroxide from which it was again precipitated with hydrochloric acid. It was again dissolved in an equivalent amount of aqueous sodium hydroxide, and the sodium salt was precipitated by salting out with sodium chloride. Ultimately, the pure acid was obtained by decomposing a solution of the purified sodium salt with hydrochloric acid. The amount of free acid recovered was 100.5 g (58% yield). M.P.250°C. $R_f$ = 0.37 (with ethyl acetate/isopropanol/ammonium hydroxide 11:7:4).

| | | | | |
|---|---|---|---|---|
| Calculated for $C_{12}H_{11}I_3N_2O_3$: | Eq.wt. | 612; | 23.55% C; | 62.22% I |
| Found: | | 610 | 23.60 | 62.32 |

Compound I is insoluble in water, methanol, ethanol, chloroform, slightly soluble in dioxane (1.5% at 20°C., 3% at 96°C.). The sodium and N-methylglucamine salts readily dissolve in equal weights of water.

EXAMPLE 10

3-N-Butyrolactamylmethyl-5-acetylamino-2,4,6-triiodobenzoic acid (Compound J)

9.15 g Compound i were heated in 75 ml acetic anhydride to 50°C., 0.2 ml sulfuric acid were added, and the mixture was stirred at 70°C. for 30 minutes, whereupon the excess of acetic anhydride was evaporated in a vacuum. The residue was dissolved in dilute sodium hydroxide, and the solution was kept at 70°C. for one hour, additional sodium hydroxide solution being added from time to time to maintain an alkaline reaction. Compound J was precipitated when the reaction mixture was ultimately acidified with hydrochloric acid, and 7.3 g were recovered (75% yield). M.P.260° - 265°C. $R_f$ = 0.18 (ethyl acetate/isopropanol/conc.ammonium hydroxide 11:7:4).

| Calculated for $C_{14}H_{13}I_3N_2O_4$: | Eq.wt. | 654; | 25.71% C; | 58.22% I |
|---|---|---|---|---|
| Found: | | 650 | 25.78 | 58.42 |

The free acid is insoluble in water, methanol, ethanol, ethyl acetate, and chloroform. The sodium and N-methylglucamine salts are soluble in equal weights of water at 20°C.

EXAMPLE 11

3-N-Butyrolactamylmethyl-5-N-butyrolactamyl-2,4,6-triiodobenzoic acid (Compound K)

4.6 g γ-Chlorobutyryl chloride were added at 90°C. to 18.4 g Compound I in 30 ml dimethylacetamide, and the mixture was stirred three hours at 90°C. and poured into 200 ml water to precipitate 20.5 g 3-N-butyrolactamylmethyl-5-N-γ-chlorobutyrylamino-2,4,6-triiodobenzoic acid. M.P. high-melting − 193°C. The acid was dissolved in 50 ml 2.5 N aqueous potassium hydroxide solution, and crude Compound K was precipitated on the next day when the solution was diluted with 200 ml water and acidified with hydrochloric acid. The 14 g crude Compound K (70% yield) having a melting point of 190° − 200°C. were dissolved in 60 ml boiling ethanol. When the solution was refluxed for a few minutes, Compound K was converted to its stable, high-melting crystalline modification which partly precipitated from the alcoholic solution while it was still warm. The yield was 11 g (55%), the melting point higher than 255° C., $R_f$ = 0.24 (ethyl acetate/isopropanol/ammonium hydroxide 55:35:20).

| Calculated for $C_{16}H_{15}I_3N_2O_4$: | Eq.wt. | 680; | 28.26% C; | 55.9% I |
|---|---|---|---|---|
| Found: | | 684 | 28.31 | 55.85 |

The free acid is insoluble in water and chloroform, slightly soluble in cold lower alkanols, somewhat soluble in boiling methanol and ethanol. The sodium and N-methylglucamine salts dissolve in equal weights of water at 20°C.

EXAMPLE 12

3-N-δ-Valerolactamylmethyl-5-amino-2,4,6-triiodobenzoic acid (Compound L)

When 46 g (0.2 mole) 3-aminomethyl-5-nitro-6-chlorobenzoic acid in 320 ml dioxane were reacted with 47.6g (0.24 mole) δ-bromovaleryl chloride for six hours at 90°C. in the manner described in Example 9 with reference to the adjacent lower homolog, 58 g 3-N-δ-bromovalerylaminomethyl-5-nitro-6-chlorobenzoic acid of M.P.123°C. and equivalent weight 380 (calculated 393) were obtained, and were dissolved in 180 ml 3.3 N aqueous potassium hydroxide solution. The corresponding lactam derivative was precipitated from the diluted solution on the next morning by means of hydrochloric acid in an amount of 35 g (1.12 mole).

When recrystallized from ethanol, the intermediate product had a melting point of 250°C., an equivalent weight of 314.5 (calculated: 312.7), and a $R_f$ value of 0.14 in a thin layer chromatogram developed with chloroform/glacial acetic acid 95:5.

25 g (0.08 Mole) of the intermediate were hydrogenated in the presence of 3 g palladium-carbon catalyst in dilute, weakly alkaline, aqueous solution, and the hydrogenated acid was iodated in the acidified solution as described above with 330 ml N KICl 2 solution at 50°C. The iodation mixture yielded 31.5 g (63%) Compound L of M.P. 163°C. and equivalent weight 623 (calculated: 626). It was converted to the high-melting, stable, crystalline modification by boiling in 150 ml methanol.

| Calculated for $C_{13}H_{13}I_3N_2O_3$: | Eq.wt. | 626; | 24.94% C; | 60.82% I |
|---|---|---|---|---|
| Found: | | 626 | 24.91 | 60.80 |

A thin-layer chromatogram developed with ethyl acetate/isopropanol/ammonium hydroxide 11:7:4 gave an $R_f$ value of 0.35. The acid is insoluble in water and chloroform, slightly soluble in lower alkanols. The sodium and N-methylglucamine salts dissolve in equal weights of water at 20°C.

EXAMPLE 13

Suberic acid bis-(3N-butyrolactamylmethyl-5-carboxy-2,4,6-triiodoanilide) (Compound M)

5.1 g (0.024 Mole) octanedioyl dichloride were added drop by drop to a solution of 24.5 g (0.04 mole) 3-N-butyrolactamylmethyl-5-amino-2,4,6-triiodobenzoic acid in 40 ml dimethylacetamide. The reaction mixture was gradually heated to 95°C., stirred at that temperature for three hours, cooled, and poured into 200 ml water. The precipitated Compound M was dissolved in sodium hydroxide solution and reprecipitated with hydrochloric acid (26.4 g), extracted repeatedly with boiling acetone, converted to the ammonium salt as described in Example 6, and a pure acid melting at 241°C. (decomp,) was ultimately obtained in an amount of 17.8 g.

| Calculated for $C_{32}H_{32}I_6N_4O_8$: | Eq.wt. | 681; | 55.90% I |
|---|---|---|---|
| Found: | | 679 | 56.49 |

A thin layer chromatogram developed with isopropanol/isobutanol/ammonium hydroxide 2:5:3 had a spot at $R_f$ = 0.45. The free acid was insoluble in water and chloroform, somewhat soluble in cold ethanol, very readily soluble in cold methanol and boiling ethanol. The sodium and N-methylglucamate salts dissolved in equal weights of water at 20°C.

EXAMPLE 14

Other dicarboxylic acid
bis-(3-N-butyrolactamylmethyl-5-carboxy-2,4,6-triiodoanilides) (Compounds N to S)

The acyl dichlorides of other dicarboxylic acids were converted by the method of Example 13 to corresponding anilides with 3-N-butyrolactamylmethyl-5-amino-2,4,6-triiodobenzoic acid in an approximate mole ratio of 1 : 2. The resulting compounds N to S were each identified by equivalent weight and elementary analysis and differed from Compound M only in the dicarboxylic acid radical. All were insoluble in water and chloroform and soluble in hot methanol and ethanol. Their sodium and N-methylglucamine salts dissolved in equal weights of water at 20°C. Other properties are listed below.

TABLE IV

| Compound | Dicarboxylic acid | M.P.°C. | $R_f$ | Note |
|---|---|---|---|---|
| N | Azelaic | 220,sint.200 | 0.50 | |
| O | Sebacic | 220–225,sint.195 | 0.59 | (1) |
| P | Pimelic | 240 (decomp.) | 0.40 | (2) |
| Q | 2-Methyladipic | 210,decomp.226 | 0.44 | (1) |
| R | 4,7-Dioxadecane-1,10-dioic | 215–220,sint.200 | 0.39 | (2) |
| S | 4,8-Dioxaundecane-1,11-dioic | 195,sint.170 | 0.46 | (1) |

Notes:
(1) Butanol/glacial acetic acid/water 3:2:1
(2) 1-Butanol/i-propanol/ammonium hydroxide 5:2:3.

The acyl dichlorides required for preparing Compounds R and S were prepared from the corresponding dicarboxylic acids by gentle heating with thionyl chloride in a manner conventional in itself and described in more detail in our simultaneously filed application claiming the priority of Swiss application No.6626/68, reference also being had to J.A.C.S.70 (1948) 1333.

EXAMPLE 15

4,7-Dioxadecane-1,10-dioic acid
bis(3-N-δ-valerolactamylmethyl-5-carboxy-2,4,6-triiodoanilide) (Compound T)

Homologs and analogs of the compounds described in Example 14 are prepared in substantially the same manner as exemplified by the following procedure.

18.35 g (0.03 Mole) 3-N-δ-valerolactamylmethyl-5-amino-2,4,6-triiodobenzoic acid were prepared as described in Example 12 and dissolved in 30 ml dimethylacetamide. The solution was mixed with 4 g (0.016 mole) 4,7-dioxadecane-1,-10-dioyl dichloride, prepared as described in Example 14, and the mixture was stirred at 95°C. for three hours.

The solvent was evaporated at 2 mm Hg, and the residue was washed with water and dissolved in dilute sodium hydroxide solution. Crude Compound T was precipitated with hydrochloric acid from the solution of its sodium salt. When recrystallized from approximately 100 ml isopopanol, the pure compound weighed 10.4 g, sintered at 200°C. and melted at 225° – 230°C. Its thin layer chromatogram developed with butanol/acetic acid/water 3:2:1 gave an $R_f$ value of 0.41.

| Calculated for $C_{34}H_{39}I_6N_3O_{10}$: | 28.71% C; | 53.54% I |
|---|---|---|
| Found: | 28.82 | 53.30 |

The free acid is insoluble in water and chloroform and very readily soluble in cold methanol and ehtanol. The sodium and N-methylglucamine salts dissolve in equal weights of water at 20°C.

EXAMPLE 16

Adipic acid
bis(3-N-butyrolactamyl-5-carboxy-2,4,6-triiodoanilide) (Compound U)

135.2 g γ-Chlorobutyryl chloride (0.48 mole) were added drop by drop over a period of 10 minutes to a solution of 143.6 g 3-amino-5-nitrobenzoic acid (0.4 mole) in 300 ml dioxane at about 80°C. The reaction mixture was stirred two hours at 80° to 90°C., then cooled, and poured into 2.2 liters water. 204 g 3-γ-Chlorobutyrylamino-5-nitrobenzoic acid (89% yield) gradually crystallized and had a melting point of 204°C. when recrystallized from ethyl acetate. The compound was identified by microanalysis:

| Calculated: | 46.08% C; | 3.86% H; | 12.37% Cl; | 9.77% N |
|---|---|---|---|---|
| Found: | 46.24 | 3.93 | 12.20 | 9.78 |

112 g 3-γ-Chlorobutyrylamino-5-nitrobenzoic acid (0.375 mole) were dissolved in 550 ml water containing 74 g 85% KOH (1.35 mole), and the solution was left to stand a few hours to cause practically complete ring closure as evidenced by the presence of an equivalent concentration of chlorine ions. It was then diluted with 500 ml water and mixed with 150 ml 18% hydrochloric acid to precipitate crude 3-N-butyrolactamyl-5-nitrobenzoic acid. It was purified by dissolution in sodium hydroxide solution and reprecipitation with hydrochloric acid, a second conversion to the sodium salt with an equivalent amount of sodium hydroxide solution, salting out of the sodium salt with sodium chloride, and decomposition of the sodium salt. The pure 3-N-butyrolactamyl-5-nitrobenzoic acid weighed 63.5 g (67.5% yield) and melted at 245°C. It was identified by elementary analysis:

| Calculated: | 52.80% C; | 4.02% H; | 11.20% N |
|---|---|---|---|
| Found: | 52.85 | 4.11 | 11.18 |

A chromatogram on silica gel developed with butyl acetate/glacial acetic acid/water 5:1:1 gave an $R_f$ value of 0.55.

25 g 3-N-Butyrolactamyl-5-nitrobenzoic acid (0.1 mole) were dissolved in 400 ml water and 100 ml N sodium hydroxide and hydrogenated at room temperature in the presence of 2.5 g 10% palladium-carbon catalyst. After an amount of hydrogen sufficient for hydrogenation of the nitro group had been consumed, the catalyst was removed by filtration, and the filtrate containing sodium 3-N-butyrolactamyl-5-aminobenzoic acid was poured into 8 liters water containing 50 ml 36% hydrochloric acid. 350 ml N KICl$_2$ solution were added to the acidic mixture in a thin stream with agitation over a period of 20 minutes, and the iodation reaction was permitted to go to completion in 15 hours at ambient temperature with continuing agitation.

The crude 3N-butyrolactamyl-5-amino-2,4,6-triiodobenzoic acid so obtained was dissolved in sodium hydroxide solution, precipitated with hydrochloric acid, and again dissolved in an equivalent amount of sodium hydroxide solution. The sodium salt was salted out with sodium chloride, and the latter was dissolved in water and decomposed with hydrochloric acid to precipitate 48 g pure 3-N-butyrolactamyl-5-amino-2,4,6-triiodobenzoic acid (80% yield) melting at 260°C. and having an $R_f$ value of 0.25 (butyl acetate/glacial acetic acid/water 5:1:1).

| Calculated: | 22.09% C; | 63.68% I |
| Found: | 22.08 | 63.54 |

An aliquot of the above hydrogenation mixture was adjusted to pH 4.1 to precipitate a sample of the 3-N-butyrolactamyl-5-aminobenzoic acid. It melted at 220°C. and was identified by elementary analysis:

| Calculated: | 59.99% C; | 5.49% H; | 12.72% N |
| Found: | 59.41 | 5.69 | 12.62 |

4.4 g Adipic acid dichloride (0.024 mole) were added dropwise to a suspension of 23.93 g 3-N-butyrolactamyl-5-amino-2,4,6-triiodobenzoic acid (0.4 mole) in 30 ml dimethylacetamide. The mixture was stirred three hours at 95°C., cooled, and stirred into 300 ml water. The crude Compound U so obtained was purified by reprecipitation from a solution in sodium hydroxide with hydrochloric acid. It was further purified by way of the morpholine salt.

22.6 g Partly purified Compound U were dissolved in 60 ml boiling methanol, 7 ml morpholine were added, and the mixture was kept at 5°C. overnight to cause crystallization of the salt which was recovered from the mother liquor and dissolved in water. The solution was poured into 3% aqueous hydrochloric acid at 70°C. to precipitate the pure Compound U which was recovered in an amount of 12.8 g (49% yield), melted at 270°C., and had an $R_f$ value of 0.35 (butanol/glacial acetic acid/water 3:2:1). It is practically insoluble in water and only sparingly soluble in methanol, ethanol, and chloroform. It was identified by its equivalent weight and elementary analysis:

| Calculated for $C_{26}H_{24}I_6N_4O_8$: | Eq.wt. 653; | 25.75% C; | 58.31% I |
| Found: | 652.5 | 25.50 | 57.90 |

The sodium and N-methylglucamine salts of Compound U dissolve in equal weights of water at 20°C.

EXAMPLE 17

Other dicarboxylic acid bis(3-N-butyrolactamyl-5-carboxy-2,4,6-triiodoanilides) (Compound V - W)

Anilides homologous to Compound U were prepared from 3-N-butyrolactamyl-5-amino-2,4,6-triiodobenzoic acid and the acyl dichlorides of pimelic and sebacic acid in the same manner as described in Example 16. Their melting points and $R_f$ values (butanol/acetic acid/water 3:2:1) are listed in Table V. Like Compound U, Compounds V and W are insoluble in water, whereas their sodium and N-methylglucamine salts dissolve very readily in water at room temperature. Both free acids were identified by their equivalent weights and elementary analysis.

TABLE V

| Compound | Dicarboxylic acid | M.P.°C. | $R_f$ |
|---|---|---|---|
| V | Pimelic | 253 | 0.39 |
| W | Sebacic | 253 | 0.52 |

EXAMPLE 18

3-N-Butyrolactamyl-5-acetylamino-methyl-2,4,6-triiodobenzoic acid (Compound X)

8.4 g (0.06 Mole) δ-chlorobutyryl chloride were added dropwise with agitation to a solution of 29.3 g (0.05 mole) 3-amino-5-acetylaminomethyl-2,4,6-triiodobenzoic acid in 60 ml dimethylacetamide over a period of 10 minutes, and the mixture so obtained was stirred three hours at 90°C., cooled, and stirred into 600 g ice water, whereby 27 g 3-δ-chlorobutyrylamino-5-acetylaminomethyl-2,4,6-triiodobenzoic acid were precipitated. M.P.145° - 147°C. (decomp.)

20.7 g Thereof were dissolved in 60 ml 2-N aqueous potassium hydroxide, and the solution was stored at room temperature for about 20 hours, whereupon it was diluted with 250 ml water, and strongly acidified with hydrochloric acid. The crude Compound X precipitated thereby was recovered by filtration and dissolved in dilute aqueous ammonium hydroxide. The solution was adjusted to pH 5-6, decolorized with active carbon, heated to 60°C., and added dropwise to 200 ml dilute hydrochloric acid having the same temperature to precipitate pure Compound X in an amount of 16.5 g (84% yield).

Compound X has a melting point of 250°C. and an $R_f$ value of 0.59 with butanol/glacial acetic acid/water 3:2:1. It is insoluble in water, whereas the sodium and N-methylglucamine salts dissolve at a rate of more than 100 g per dl in water at 20°C.

Compound X was identified by its equivalent weight and elementary analysis:

| Calculated for $C_{14}H_{13}I_3N_2O_5$: | Eq.wt. 654; | 25.71% C; | 58.22% I |
| Found: | 646 | 25.59 | 58.11 |

EXAMPLE 19

3-(Morpholinon-3'-yl-4')-5-acetylaminomethyl-2,4,6-triiodobenzoic acid (Compound Z)

In the manner described in Example 18, 29.3 g 3-amino-5-acetylaminomethyl-2,4,6-triiodobenzoic acid in 60 ml dimethylacetamide were reacted with 9.6 g β-chloroethoxyacetyl chloride. There were obtained 24 g 3-β-chloroethoxyacetylamino-5-acetylaminomethyl-2,4,6-triiodobenzoic acid melting at 233° - 235°C. (decomp.) of which 23.5 g were dissolved in 60 ml 2 N potassium hydroxide solution. The solution was stored for about 20 hours at room temperature, and Compound Z was thereafter precipitated and purified as described above.

The amount of pure Compound Z recovered was 19.3 g (87% yield). M.P.230°C. (decomp.) $R_f$ = 0.61. The compound was identified by its equivalent weight and elementary analysis:

| Calculated for $C_{14}H_{13}I_3N_2O_5$: | Eq.wt. | 670; | 25.10% C; | 56.03% I |
|---|---|---|---|---|
| Found: | | 680 | 25.03 | 56.68 |

The free Compound Z is practically insoluble in water, methanol, ethanol, and chloroform, while its sodium and N-methylglucamine salts dissolve readily in equal weights of water at 20°C.

EXAMPLE 20

5-N-alkyl-derivatives of Compounds G and J (Compounds GA, GB, JA, and JB)

A solution of 5.35 g methyl iodide (0.0375 mole) in 3 ml acetone was added dropwise with agitation to a solution of 16.35 g Compound J (0.025 mole; see Example 10) in 25 ml N potassium hydroxide at room temperature. After three hours, the mixture was heated to 40° - 45°C. It was held at this temperature for a few hours, cooled, diluted with 60 ml water, and extracted twice with 25 ml diethyl ether. The aqueous phase was purged of ether in a vacuum and thereafter poured into 120 ml 3% hydrochloric acid to precipitate crude 3-N-Butyrolactamylmethyl-5-N-methylacetylamino-2,4,6-triiodobenzoic acid (Compound JA).

The crude material was dissolved in 40 ml boiling methanol, and the solution was mixed with an equivalent amount of morpholine and left to stand for a few hours. A tacky, amorphous precipitate was formed and removed by filtration. The filtrate was decolorized with active carbon, and 60 ml diethyl ether was added to precipitate the morpholine salt of Compound JA. It was dissolved in 50 ml water, and the solution was poured into 100 ml 3% hydrochloric acid. The precipitated pure Compound JA was recovered in an amount of 8.6 g (52% yield). M.P.280°C. $R_f = 0.40$ (ethyl acetate/isopropanol/ammonium hydroxide 11:7:4).

| Calculated for $C_{15}H_{15}I_3N_2O_4$: | Eq.wt. | 668; | 26.96% C; | 57.00% I |
|---|---|---|---|---|
| Found: | | 676 | 26.93 | 56.94 |

The free acid is practically insoluble in water, the sodium and N-methylglucamine salts readily dissolve in water at room temperature.

3-N-Butyrolactamylmethyl-5-N-ethylacetylamino-2,4,6-triiodobenzoic acid (Compound JB) was obtained in a similar yield when ethyl iodide in the preceding procedure was substituted for methyl iodide, and the alkylation temperature was raised to 55° - 60°C.

The pure Compound JB melted at 267°C. and had an $R_f$ value of 0.35 with the last-described solvent system. The solubilities of the free Compound and of its salts are not significantly different from the corresponding values for the lower homolog.

When Compound G (Example 7) was reacted with methyl iodide in the manner described above, there was obtained 3-N-butyrolactamyl-5-N-methylacetylamino-2,4,6-triiodobenzoic acid (Compound GA) melting at 257°C. and having an $R_f$ value of 0.63 with butanol/glacial acetic acid/water 3:2:1.

The reaction of Compound G with ethyl iodide yielded 3-N-butyrolactamyl-5-N-ethylacetylamino-2,4,6-triiodobenzoic acid (Compound GB) melting at 255°C., and having an $R_f$ value of 0.68 with the last-mentioned solvent system.

For each of Compounds JB, GA, and GB, the equivalent weight was determined and an elementary analysis was made. The values obtained closely agreed with those calculated from the assumed formulas.

EXAMPLE 21

An intravenously injectable solution was prepared according to the following prescription:

| Compound J (Example 10) | | 51.6 | g |
|---|---|---|---|
| N-Methylglucamine | | 13.89 | g |
| Sodium hydroxide | | 0.316 | g |
| Disodium edetate | | 0.004 | g |
| Bi-distilled water | to make | 100 | ml |

The chelating agent was first dissolved in a small portion of the water, the other solutes were added in the listed sequence with stirring and dissolved, and the concentrate so obtained was adjusted to pH 7.1 ± 0.2. The remainder of the water was then added, and the solution was subjected to ultrafiltration, transferred to 20 ml vials, and sterilized.

It contained 300 mg iodine per ml, and was successfully used for visualizing the urinary tract after intravenous injection in an amount corresponding to approximately 200 mg of the radiopaque compound per kg body weight. Similar success was had with other radiopaque compounds of the invention containing one triodobenzoic acid moiety in solutions containing 30% to 60% of the active agents and 150 to 350 mg iodine per ml.

R' in these compounds was hydrogen, acylamino, N-alkylacylamino, acrylaminomethyl, N-alkylcarbamyl, or the radical of a lactam or of morpholinone.

The same compounds, when employed in solutions containing 300 to 450 mg iodine per milliliter (500 to 900 mg/ml active agent) have been used for angiography and angiocardiography by intraarterial injection, the prescription of Example 22 being representative of such solutions.

EXAMPLE 22

| Compound N (Example 14) | | 721 | g |
|---|---|---|---|
| N-Methylglucamine | | 176 | g |
| Sodium hydroxide | | 8 | g |
| Disodium edetate | | 0.04 | g |
| Bi-distilled water | to make | 1,000 | ml |

The solution was prepared as described in Example 21, adjusted to pH 7.1 ± 0.2, ultrafiltered, transferred to 10 ml and 20 ml vials and to rubber capped bottles of 100 ml capacity, and sterilized. It contained 420 ml iodine per milliliter, and was injected in the usual manner in amounts of approximately 200 to 600 mg active agent per kilogram body weight.

EXAMPLE 23

An intravenously injectable solution was prepared according to the following prescription:

| Compound R (Example 14) | | 550 | g |
|---|---|---|---|
| N-Methylglucamine | | 103 | g |
| Sodium hydroxide | | 12 | g |
| Disodium edetate | | 0.04 | g |
| Bidistilled water | to make | 1,000 | ml | the ingredients were combined as described in Example 21, the solution was adjusted to pH 7.0 ± 0.1, ultrafiltered, and sterilized in 20 ml vials for intravenous injection preceding cholecystography. It contained 300 mg iodine per milliliter. The amount required for visualizing a human gall bladder corresponded to about 4 to 12 g of the active agent, a dosage of 8 g giving satisfactory contrast in most adult patients.

Equally satisfactory results were achieved by parenteral application of the other compounds of the invention having two triiodobenzoic acid moieties in each molecule, the iodine content of the solutions being between 150 and 350 mg per milliliter.

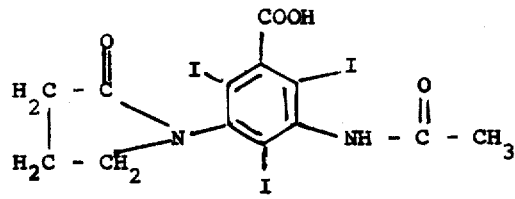

What is claimed is:

1. A compound of the formula R - R' wherein R is

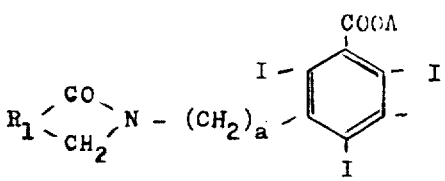

R' is hydrogen,

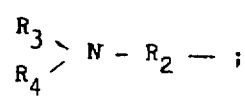

or

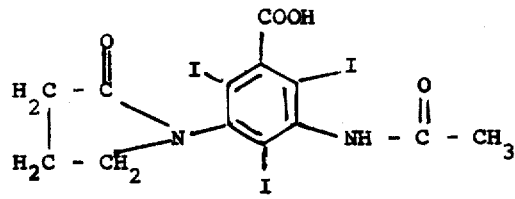

$R_1$ is alkylene having 2 or 3 carbon atoms;
$R_2$ is $-(CH_2)_a$;
$R_3$ is hydrogen or acetyl;
$R_4$ is hydrogen, methyl, or $R-NH-CO-R_5-CO-$, $R_3$ being hydrogen when $R_4$ is $R-NH-CO-R_5-CO-$;
$R_5$ is alkylene or polyoxaalkylene having 4 to 8 carbon atoms;
$a$ is either zero or one; and
A is hydrogen or a non-toxic metal or amine, the compound being water-soluble when A is said metal or amine.

2. A compound as set forth in claim 1, wherein A is hydrogen, sodium, lithium, or alkanolamine.

3. A compound as set forth in claim 1, wherein $R_1$ is $-C_2H_4-$, $a$ is zero, and R' is acetylamino.

4. A compound as set forth in claim 1, wherein $R_1$ is $-C_2H_4-$, $a$ is zero, R' is acetylaminomethyl.

5. A compound as set forth in claim 1, wherein $R_1$ is $-C_2H_4-$, $a$ is one, and R' is N-methyl-N-acetylamino.

6. A compound as set forth in claim 1, wherein $R_1$ is $-C_2H_4-$, $a$ is one, and $R_4$ is $R-NH-CO-R_5-CO-$.

7. A compound as set forth in claim 6, wherein $R_5$ is $-(CH_2)_7-$.

8. A compound as set forth in claim 6, wherein $R_5$ is $-(CH_2)_8-$.

9. A compound as set forth in claim 6, wherein $R_5$ is $-(CH_2)_6-$.

10. A compound as set forth in claim 6, wherein $R_5$ is $-(CH_2)_5-$.

11. A compound as set forth in claim 6, wherein $R_5$ is $-(CH_2)_2-O-(CH_2)_2-O-(CH_2)_2-$.

12. A compound as set forth in claim 6, wherein $R_5$ is $-(CH_2)_2-O-(CH_2)_3-O-(CH_2)_2-$.

13. A compound as set forth in claim 2, wherein $R_1$ is $-(CH_2)_3-$, $a$ is one, and $R_4$ is $R-NH-CO-R_5-CO-$.

14. A compound as set forth in claim 13, wherein $R_5$ is $-(CH_2)_2-O-(CH_2)-O-(CH_2)_2-$.

15. A compound as set forth in claim 2, wherein $R_1$ is $-(CH_2)_2-$, $a$ is zero, and $R_4$ is $R-NH-CO-R_5-CO-$.

16. A compound as set forth in claim 15, wherein $R_5$ is $-(CH_2)_4$.

17. A compound as set forth in claim 15, wherein $R_5$ is $-(CH_2)_5$.

18. A compound as set forth in claim 15, wherein $R_5$ is $-(CH_2)_8$.

19. The compound of the formula